(12) United States Patent
Barnhardt

(10) Patent No.: US 6,669,891 B1
(45) Date of Patent: Dec. 30, 2003

(54) METHOD AND APPARATUS FOR PRODUCING BRAKE LINING MATERIAL

(75) Inventor: Keith F. Barnhardt, Bloomington, IN (US)

(73) Assignee: Midwest Brake Bond Company, Warren, MI (US)

( * ) Notice: Subject to any disclaimer, the term of this patent is extended or adjusted under 35 U.S.C. 154(b) by 0 days.

(21) Appl. No.: 09/286,088

(22) Filed: Apr. 2, 1999

(51) Int. Cl.⁷ .............................. B27N 3/18; B28B 3/00; B29C 41/46; B29C 43/02; B29C 51/00
(52) U.S. Cl. ................. 264/319; 264/109; 264/119; 264/303; 264/334; 264/328.9; 425/410; 425/411; 425/416; 425/422; 425/443; 425/DIG. 127
(58) Field of Search .................. 264/109, 119, 264/319, 303, 334, 328.9; 425/410, 411, 416, 422, 443, DIG. 127

(56) References Cited

U.S. PATENT DOCUMENTS

| | | | |
|---|---|---|---|
| 2,057,466 A | * 10/1936 | Willetts | |
| 2,913,766 A | * 11/1959 | Haller | |
| 3,534,439 A | * 10/1970 | Haas et al. | |
| 3,632,276 A | * 1/1972 | Munk | 425/415 |
| 3,881,982 A | 5/1975 | Morgan, Sr. et al. | 156/309 |
| 4,008,517 A | 2/1977 | Schrader et al. | 29/527.6 |
| 4,531,276 A | 7/1985 | Warwick et al. | 29/417 |
| 4,573,249 A | 3/1986 | Shellhause | 29/432 |
| 4,860,570 A | 8/1989 | Perrault et al. | 72/379 |
| 4,900,240 A | 2/1990 | Leinweber | 425/110 |
| 5,003,809 A | 4/1991 | Oyama | 72/446 |
| 5,024,811 A | * 6/1991 | Hinzmann et al. | 419/66 |
| 5,044,925 A | * 9/1991 | Watanabe | 425/542 |
| 5,174,146 A | 12/1992 | Heurteboust et al. | 72/348 |
| 5,310,330 A | * 5/1994 | Zweig et al. | 425/116 |
| 5,621,958 A | 4/1997 | Woodcox | 29/426.4 |
| 6,003,339 A | * 12/1999 | Morikita | 65/275 |

FOREIGN PATENT DOCUMENTS

JP 5692040 A * 7/1981 ............ B29G/1/00

* cited by examiner

*Primary Examiner*—Michael Colaianni
(74) *Attorney, Agent, or Firm*—Harness, Dickey & Pierce, PLC

(57) ABSTRACT

An apparatus and method for producing a sheet of brake lining material utilizes a mold which has a mold base and a mold frame. The mold frame is slidingly received on the mold base. The sliding relationship between the mold frame and the mold base results in a mold cavity which has a variable volume. The variable volume of the mold cavity allows the cavity to adjust to the size of material initially placed in the mold cavity thereby eliminating any mold flash and/or scrap material.

5 Claims, 2 Drawing Sheets

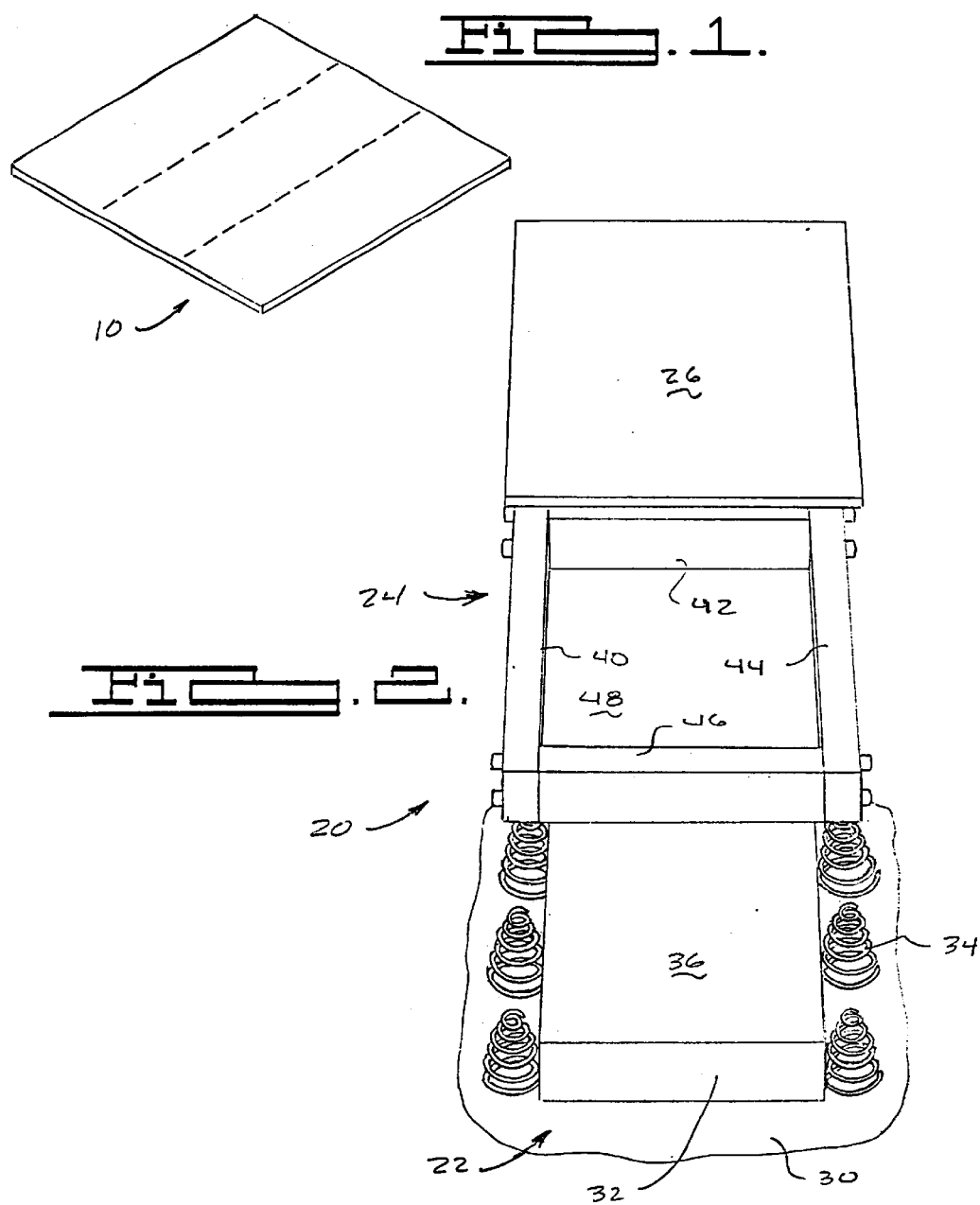
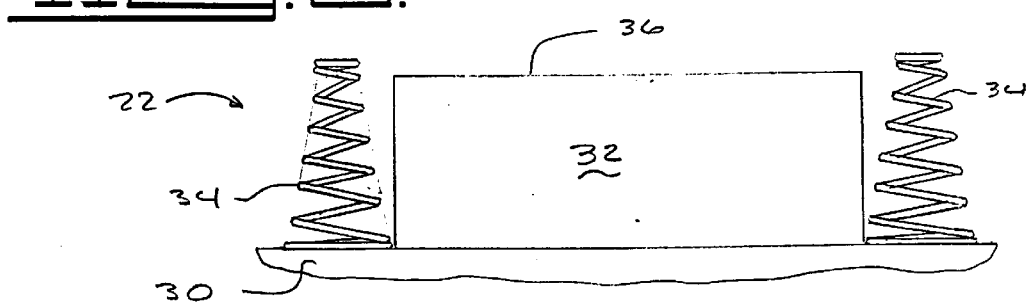

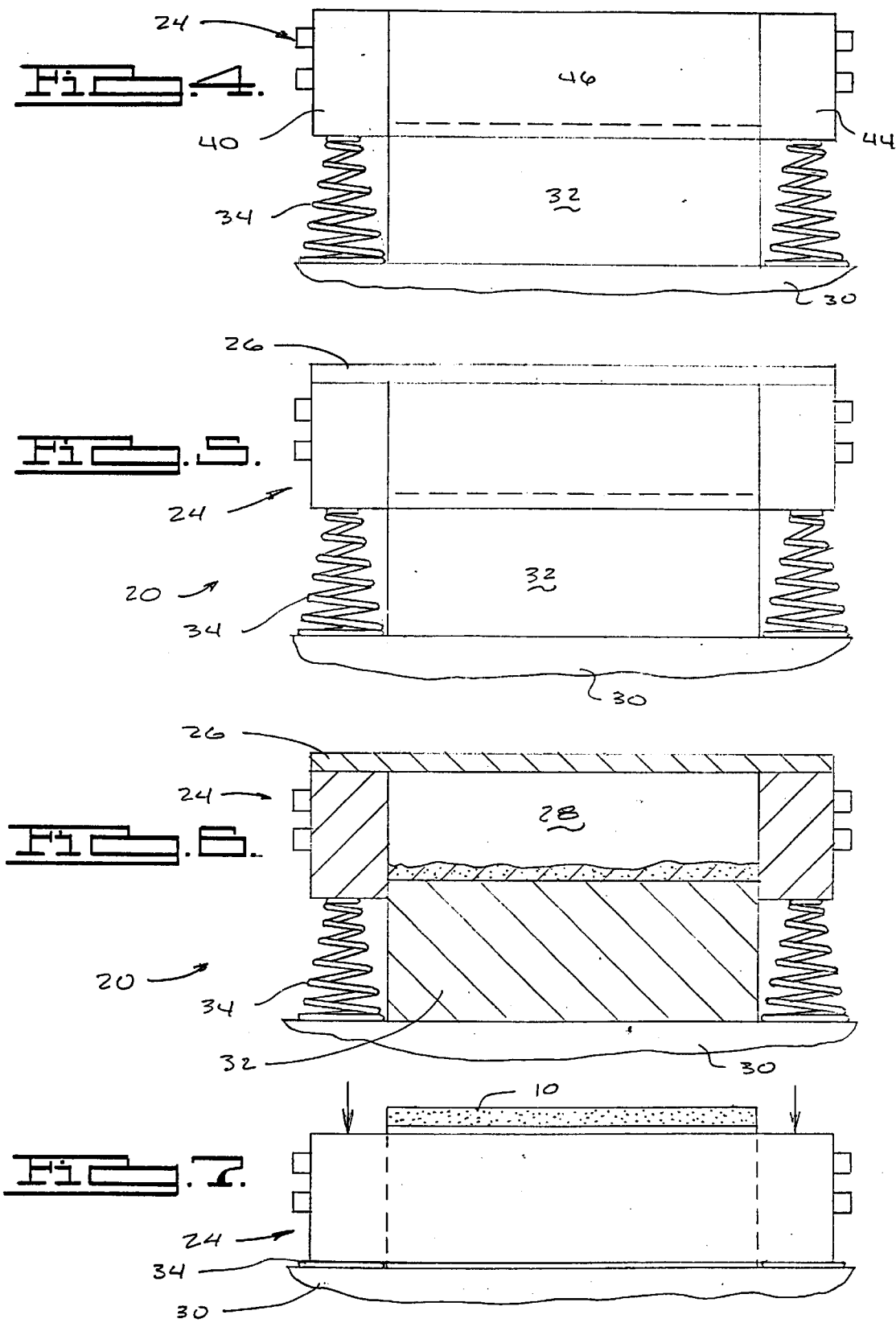

METHOD AND APPARATUS FOR PRODUCING BRAKE LINING MATERIAL

FIELD OF THE INVENTION

The present invention relates to brake lining material. More particularly, the present invention relates to a method and apparatus for the manufacture of the brake lining material used in various braking applications.

BACKGROUND OF THE INVENTION

The automotive industry, including both cars and trucks, and the manufacturing community utilize drum brakes for their braking systems. The drum brake is known as an internal expansion brake and it includes a brake drum having an internal generally circular cylindrical braking surface. The brake drum normally rotates with the vehicles wheel or with a rotating component of a machine tool. One or more brake shoes are located within the center of the circular cylindrical braking surface. The brake shoes have a frame onto which is attached a sacrificial brake lining which is shaped to mate with the braking surface of the brake drum. The rotating wheel or component is stopped by radially extending the brake shoe such that the sacrificial lining frictionally engages the braking surface on the brake drum. The energy of the rotating wheel or component is dissipated by the frictional engagement between the braking surface of the brake drum and the brake lining on the brake shoe. Over time and use, the sacrificial lining is worn away and has to be replaced in order for the braking system to continue to function. Normally this involves the replacement of the brake shoe and the resurfacing of the braking surface of the brake drum. The worn brake shoe is not discarded, it is sent back to a rebuilder who removes the old lining from the frame and replaces it with a new lining. The brake linings generally are circular cylindrical segments which may be bonded, riveted or otherwise attached to the frame of the brake shoe.

The material for the brake lining is normally supplied in a flat rectangular shape. The material is either of the proper dimensions to form the lining for the brake shoe or the flat rectangular sheet of material is cut into one or more rectangular pieces to form the brake lining material. The final sized flat rectangular piece of brake lining material is then formed into a curved shape and attached to the frame of the brake shoe by bonding methods, riveting or the like.

Conventionally, the flat rectangular shape of brake lining material is formed in a press having a mold of the proper dimensions for the brake lining material. A pellet of uncured brake lining material is inserted into the mold and a punch is pressed against the pellet of material forcing it to fill the mold and thus take on the desired flat rectangular shape. The punch is continuously moved toward the open mold until it contacts a stop which is usually the top surface of the mold. Once the material has been fully cured, the punch retracts and ejector pins push the completed brake lining material out of the mold. In order to ensure that a complete fill of the mold is obtained, the pellet is sized to be larger than the volume of the mold. Typically, the pellet is 5% larger than the volume of the mold. This excess material is formed as molding flash which must be trimmed from the finished sheet of brake lining material and then discarded.

Thus, the conventional methods of manufacturing a sheet of brake lining material suffer from two disadvantages. First, it is necessary to build into the process a 5% waste factor due to the need to completely fill the mold. Second, the 5% waste ends up as mold flash which requires an additional trimming operation before the material can be used.

The continued development of manufacturing processes for the brake lining materials has been directed towards method of eliminating the excess material, the accompanying scrap and the additional manufacturing operation required because of the excess material.

SUMMARY OF THE INVENTION

The present invention provides the art with a method and apparatus for producing a sheet of brake lining material without using excess material and thus eliminating the accompanying scrap and the additional manufacturing operation. The present invention utilizes a stepped mold base around which is disposed a mold frame. The mold frame is movable with respect to the mold base. A precise amount of brake lining material is placed within the mold frame which is then covered. The forming press then engages the mold and presses against the mold to move the mold frame and layer with respect to the base until a predetermined pressure is reached and not to a predetermined stop. The positive pressure molding is permitted because of the design of the mold where the mold frame is free to move with respect to the base. Thus, the thickness of the molded sheet will be dictated by the amount of material in the preformed pellet with the positive pressure molding ensuring complete fill of the mold.

Other advantages and objects of the present invention will become apparent to those skilled in the art from the subsequent detailed description, appended claims and drawings.

BREEF DESCRIPTION OF THE DRAWINGS

In the drawings which illustrate the best mode presently contemplated for carrying out the present invention:

FIG. 1 is a perspective view of a generally flat rectangular sheet of brake lining material;

FIG. 2 is an exploded perspective view of the mold assembly utilized to manufacture the brake lining material shown in FIG. 1;

FIG. 3 is a side elevational view of the mold base shown in FIG. 2;

FIG. 4 is a side elevational view of the mold frame assembled to the mold base shown in FIG. 3;

FIG. 5 is a side elevational view of the cover assembled to the mold frame and the mold base shown in FIG. 4;

FIG. 6 is a side cross-sectional view of the mold assembly shown in FIG. 5;

FIG. 7 is a side elevational view showing the ejection of the completed sheet of brake lining material.

DETAILED DESCRIPTION OF THE PREFERRED EMBODIMENT

Referring now to the drawings in which like reference numerals designate like or corresponding parts throughout the several views, there is shown in FIG. 1 a typical sheet of brake lining material which is designated generally by the reference numeral 10. Brake lining material 10 is manufactured to a specified rectangular shape and thickness such that it can be formed into the desired shape to be secured to the frame of a brake shoe. As shown in FIG. 1, brake lining material 10 is designed such that it can be cut into a plurality of blanks for mating with the frame of a brake shoe as shown by the broken lines in FIG. 1.

Referring now to FIG. 2, a mold assembly 20 which is used to manufacture brake lining material 10 is disclosed.

Mold assembly 20 comprises a mold base 22, a mold frame 24, a cover 26 all of which combine to form a mold cavity 28.

Mold base 22 is shown in FIGS. 2 and 3 and it comprises a support structure 30, an upright platform 32 and a plurality of conical springs 34. Platform 32 includes an upper surface 36 which forms a portion of mold cavity 28 for molding material 10. The plurality of conical springs 34 are spaced around the perimeter of platform 32 and are preferably secured to support structure 30. Conical springs 34 are utilized due to their ability to be compressed to a height equal to the wire diameter of the spring. This permits the ejection of the finished brake lining material 10 as will be described later herein.

Referring now to FIGS. 2 and 4, mold frame 24 comprises four walls 40, 42, 44 and 46 which define a rectangular cavity 48. Cavity 48 is sized to be slidingly received over platform 32 of mold base 22. The interior surface of cavity 48 forms another portion of mold cavity 28 for molding material 10. As shown in FIG. 4 mold frame 24 is slidingly received over platform 32 and is supported by the plurality of springs 34.

Referring now to FIGS. 2, 5 and 6, the complete mold assembly 20 is illustrated. Cover 26 is placed on the upper surface of mold frame 24 to complete and close mold cavity 28. Cover 26 is a generally rectangular component of suitable thickness to withstand the molding pressures with minimal deflection and/or distortion.

The molding of brake lining material 10 begins with cover 26 being removed from mold frame 24 and with mold frame 24 being assembled to mold base 22 as shown in FIG. 4. A pre-specified amount or volume of material is placed into open cavity 28. The amount of material is determined by the size of brake lining material 10 which is going to be produced. The outside dimensions of cavity 28 are defined by mold frame 24. Thus, any variation in the amount of material initially placed within cavity 28 will result in a variation of the thickness of the finished brake lining material 10. This is because the sliding movement of mold frame 24 with respect to mold base 22 allows cavity 28 to have a variable volume to accommodate the variation in the amount of material initially placed within cavity 28. By maintaining minimal variation in the amount of material initially placed within cavity 28, the variation in the thickness of the finished brake lining material 10 will be minimized. Also, because the variation in the amount of material initially placed within cavity 28 will be spread out over the entire surface area of the finished brake lining material 10, the variation in the thickness of the finished brake lining material will be minute.

Once the pre-specified amount of material is placed within cavity 28, cover 26 is moved towards mold frame 24. Mold assembly 20 is normally placed within a press with mold base 22 and mold frame 24 being disposed in the base of the press and cover 26 being disposed on the roof of the press. As the press is cycled, cover 26 contacts either the pre-specified material within cavity 28 or the upper surface of mold frame 24 depending on the size and shape of the material in comparison with cavity 28. As the ram forces cover 26 downward, the material is formed into the shape of cavity 28 with the plurality of springs 34 compressing as the ram moves downward. The ram of the press continues downward until a pre-determined molding pressure is applied to the brake lining material. The unique construction of mold assembly 20 with the variable height and thus volume for cavity 28 allows for the continued movement of mold frame 24 with respect to mold base 22 allowing for brake lining material 10 to resist the pressure being applied by the press. This positive pressure molding technique ensures complete filling of cavity 28 and the elimination of molding flash and thus the elimination of any scrap material.

Referring now to FIG. 7, the ejection of brake lining material 10 from mold assembly 20 is disclosed. Due to the unique construction of mold assembly 20, the typical ejector pins for the mold assembly are not required. Instead, the ejection of brake lining material 10 from mold assembly 20 is accomplished by first removing cover 26 and then exerting a force on the upper surface of mold frame 24. Mold frame 24 will slide downward along mold base 22 collapsing the plurality of conical springs 34. The plurality of conical springs 34 are able to collapse to a height equal to the diameter of the wire of the springs. Thus, by having the height of platform 32 greater than the height of the mold frame plus the collapsed dimension of springs 34, ejection of brake lining material 10 from mold cavity 28 can be accomplished by the movement of mold frame 24 along mold base 22 as shown in FIG. 7. Material 10 is removed from mold assembly 20 and the above process repeats itself for continued production of brake lining material.

While mold assembly 20 has been illustrated and described using the plurality of conical springs 34, it is within the scope of the present invention to utilize any of the other types of compression springs. The requirement for ejection of the brake lining material is that the height of platform 32 must be sufficient for mold frame 24 to slide along such that platform 32 extends level with or above the upper surface of mold frame 24 to eject the brake lining material.

While the above detailed description describes the preferred embodiment of the present invention, it should be understood that the present invention is susceptible to modification, variation and alteration without deviating from the scope and fair meaning of the subjoined claims.

What is claimed is:

1. A method of producing a sheet of brake lining material in a mold having a mold base and a mold frame, said method comprising the steps of:

placing a pre-specified amount of brake lining material within a mold cavity having a volume defined by said mold base and said mold frame;

forming said pre-specified volume of brake lining material within said mold cavity;

adjusting said volume of said mold cavity to equal said volume of said pre-specified amount of brake lining material during said forming step to produce said sheet of brake lining material; and terminating said forming step when a pre-determined molding pressure is applied to said sheet of brake lining material.

2. The method according to claim 1 wherein said mold cavity defines a height and said step of adjusting said volume adjusts said height of said mold cavity.

3. The method according to claim 1 wherein said step of adjusting said volume moves said mold frame with respect to said mold base.

4. The method according to claim 1 further comprising the step of ejecting said sheet of brake lining material from said mold cavity.

5. The method according to claim 4 wherein said step of ejecting said sheet of brake lining material moves said mold frame with respect to said mold base.

* * * * *

UNITED STATES PATENT AND TRADEMARK OFFICE
CERTIFICATE OF CORRECTION

PATENT NO. : 6,669,891 B1
DATED : December 30, 2003
INVENTOR(S) : Barnhardt

It is certified that error appears in the above-identified patent and that said Letters Patent is hereby corrected as shown below:

<u>Title page,</u>
Item [*] Notice:, should read -- Subject to any disclaimer, the term of this patent is extended or adjusted under 35 U.S.C. 154(b) by 260 days. --

Signed and Sealed this

Thirteenth Day of April, 2004

JON W. DUDAS
*Acting Director of the United States Patent and Trademark Office*